A. KINGSBURY.
THRUST BEARING.
APPLICATION FILED AUG. 29, 1917.

1,270,622.

Patented June 25, 1918.

Inventor
Albert Kingsbury
By his Attorneys
Marshall & Dearborn

UNITED STATES PATENT OFFICE.

ALBERT KINGSBURY, OF PITTSBURGH, PENNSYLVANIA.

THRUST-BEARING.

1,270,622.      Specification of Letters Patent.     Patented June 25, 1918.

Original application filed April 5, 1916, Serial No. 89,000. Divided and this application filed August 29, 1917. Serial No. 188,723.

*To all whom it may concern:*

Be it known that I, ALBERT KINGSBURY, a citizen of the United States, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to thrust bearings and particularly to such as embody bearing members which are tilted by the wedging action of the oil when the bearing is in operation.

This application is a division of my copending application Serial No. 89,000, filed April 5th, 1916, for thrust bearings.

One object of my present invention is to provide a simple and reliable bearing member embodying particularly effective means for preventing the improper distortion of that portion of the tiltable member which is provided with the bearing surface even if the bearing surface is relatively large.

Another object is to provide a unitary tiltable member which possesses all the advantages of a one-piece bearing shoe and at the same time avoids the possibility of improperly distorting the bearing surface.

Another object is to provide a bearing shoe that shall truly coöperate with and conform to the opposed bearing surface although the latter is crowned or distorted when the bearing is in operation as hereinafter explained.

Other objects and advantages of my invention will be set forth hereinafter, and in order that my invention may be thoroughly understood, I will now proceed to describe the same in the following specification, and then point out the novel features thereof in appended claims.

Referring to the drawings.

Figure 1:
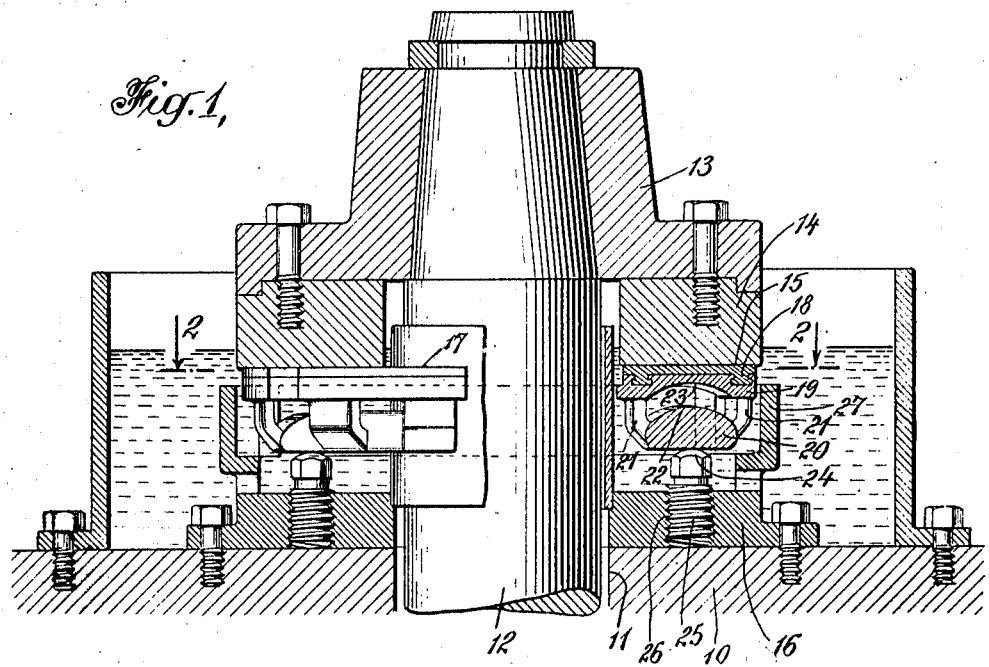
Figure 1 is a sectional elevation on the line 1—1 of Fig. 2, of a bearing which embodies my invention.
Figure 2:
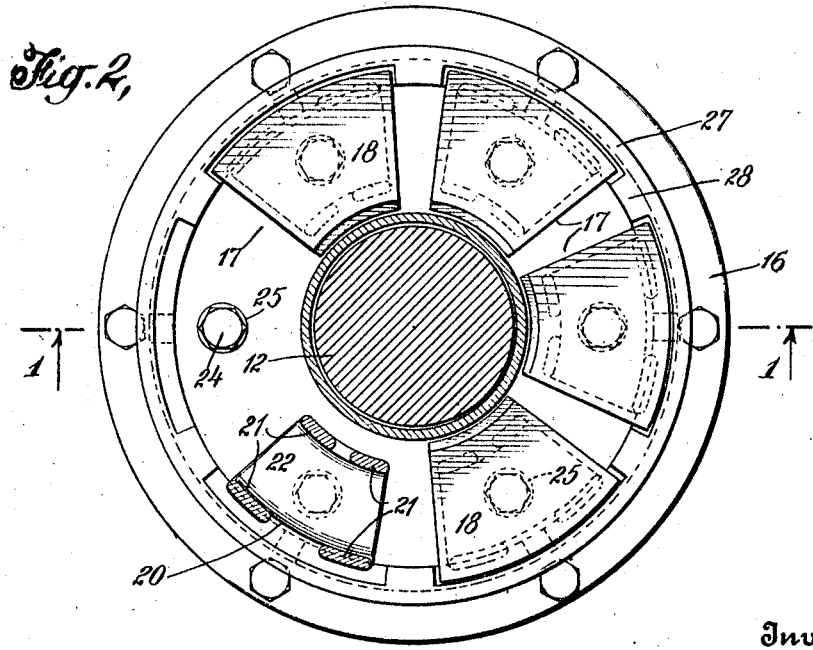
Fig. 2 is a partially sectional plan view on the line 2—2 of Fig. 1.

Referring first to Figs. 1 and 2, the structure here shown comprises a stationary frame 10 having a hole or opening 11 through which extends a shaft 12. Secured to the shaft near its upper end is a thrust block 13 to which is bolted or otherwise attached a thrust collar 14 having an annular bearing surface 15.

Bolted or otherwise secured to the frame is a base 16 upon which a plurality of bearing shoes 17 are tiltably mounted.

As clearly shown in Fig. 1, the bearing shoes 17 are unitary structures which may be integral if desired. Each shoe is preferably provided with a face 18 of soft metal and is composed of a bearing member 19, a supporting member 20, and spacing lugs or webs 21. The supporting member has the same form in general, as the bearing member, but is slightly smaller, as viewed in plan, and has a convex top surface 22 which is directly opposite a concave surface 23 of the bearing member. The concavity of 19 increases its flexibility, and the convexity of 20 makes it more rigid. Neither is essential to the invention.

The support is mounted upon the spherically curved head 24 of a screw 25 constituting an adjustable pivotal support. The several screws or studs on which the bearing shoes are mounted are screwed into tapped holes 26 in the base 16.

The shoe may, of course, be tiltably supported in any suitable manner.

The spacing lugs or webs 21 are distributed as clearly indicated in Fig. 2, so as to support the bearing members near its edges. By this means the bearing surface member of the shoe which is directly subjected to the wedging action of the lubricating fluid when the bearing is in operation is relatively flexible, and supported at many points. Thus not only is convex curving of the bearing surface or other improper distortion of the bearing surface member prevented, but furthermore the member is adapted by reason of its flexibility to conform to the surface of the thrust collar 14 or other opposed bearing surface with which it may coöperate even though the latter is crowned or curved in operation.

At the same time the shoe is a unit and is free to tilt as such upon the adjustable supporting screw on which it is mounted.

The bearing shoe construction disclosed and claimed has the further advantage of lightness and the still greater advantage of permitting rapid temperature equalization, due to the fact that the portion subjected to heating—the bearing surface—is very thin, and due to the further fact that the parts surrounding the bearing surface have very large radiation and conduction surfaces, and are in intimate contact with the liquid of the oil bath. Rapid temperature equalization of the bearing surfaces tends to prevent crowning of either the shoes or the thrust collar.

The structure illustrated may be modified in various ways within the spirit and scope of my invention, and I intend only such limitations as are imposed by the appended claims.

What I claim is:

1. A tiltable bearing shoe comprising a bearing member, a supporting member, and a plurality of integral webs supporting the bearing member.

2. A tiltable bearing shoe comprising a relatively flexible bearing member, a supporting member, and a plurality of integral webs supporting the bearing member.

3. A unitary tiltable bearing shoe comprising a bearing member, a supporting member, and a plurality of integral webs supporting the bearing member near its edges.

4. A tiltable bearing shoe comprising a relatively flexible bearing member, and means integral therewith for supporting the bearing member at a plurality of distributed points.

5. A unitary shoe comprising a relatively flexible bearing member having a concave bottom surface, a supporting member, and a plurality of integral webs supporting the bearing member near its edges.

6. A unitary bearing shoe comprising a bearing member, and a supporting member having a plurality of integral webs spacing the aforesaid members apart.

7. A unitary bearing shoe comprising a bearing member having a concave bottom surface, a supporting member having a convex top surface and a plurality of integral webs spacing the aforesaid members apart.

8. A unitary bearing shoe comprising a relatively flexible member having a concave bottom surface, a rigid supporting member having a convex top surface and a plurality of integral webs spacing the aforesaid members apart.

In witness whereof, I have hereunto set my hand this 27th day of August, 1917.

ALBERT KINGSBURY.